(12) United States Patent
Steinblatt

(10) Patent No.: US 6,407,849 B1
(45) Date of Patent: *Jun. 18, 2002

(54) METHOD AND SYSTEM FOR ILLUMINATION USING LASER DIODE BAR AND MICROLENSES ARRAY OF SAME PITCH

(75) Inventor: Serge Steinblatt, Ra'anana (IL)

(73) Assignee: CreoScitex Corporation Ltd, Herzlia (IL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/345,793

(22) Filed: Jul. 1, 1999

(51) Int. Cl.$^7$ ............................ G02B 26/00; G02B 1/00; G02F 1/03
(52) U.S. Cl. .................... 359/290; 359/321; 359/41; 359/254
(58) Field of Search .................. 359/321, 41, 254, 359/259, 619, 245; 355/40

(56) References Cited

U.S. PATENT DOCUMENTS

| | | | | |
|---|---|---|---|---|
| 4,343,009 A | * | 8/1982 | Lutz et al. ................. | 346/108 |
| 5,517,359 A | | 5/1996 | Gelbart ....................... | 359/623 |
| 5,521,748 A | | 5/1996 | Sarraf ......................... | 359/321 |
| 5,900,981 A | * | 5/1999 | Oren et al. .................. | 359/619 |
| 5,923,475 A | | 7/1999 | Kurtz et al. ................. | 359/619 |
| 5,959,763 A | * | 9/1999 | Bozler et al. ............... | 359/290 |
| 6,051,179 A | * | 4/2000 | Hagenau ..................... | 264/401 |
| 6,091,463 A | * | 7/2000 | Robinson .................... | 349/25 |

* cited by examiner

*Primary Examiner*—Georgia Epps
*Assistant Examiner*—Tim Thompson
(74) *Attorney, Agent, or Firm*—Eitan, Pearl, Latzer & Cohen-Zedek

(57) ABSTRACT

A system and a method for illuminating a spatial light modulator, where all the pixels of the SLM are illuminated symmetrically with respect to the optical axis, thus reducing the crosstalk problem. The system includes a linear array of light sources for generating a plurality of light beams, a linear array of microlenses, each of the microlenses receiving light from a corresponding light source of the array of light sources, an optical element for receiving light from the array of microlenses and for redirecting it and a spatial light modulator including an array of pixels for modulating the light. The distance between the array of microlenses and the optical element is such that all the pixels of the SLM are illuminated symmetrically with respect to the optical axis of the optical element.

24 Claims, 7 Drawing Sheets

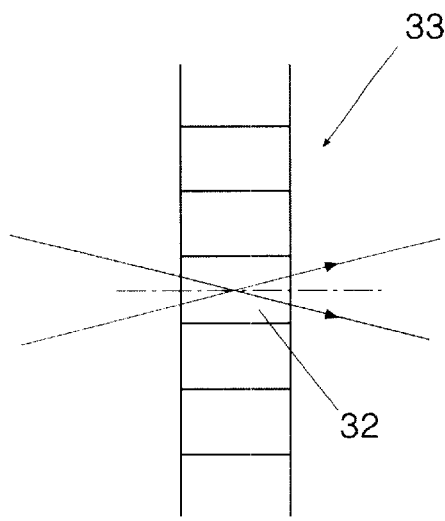
FIG. 3-A(PRIOR ART)
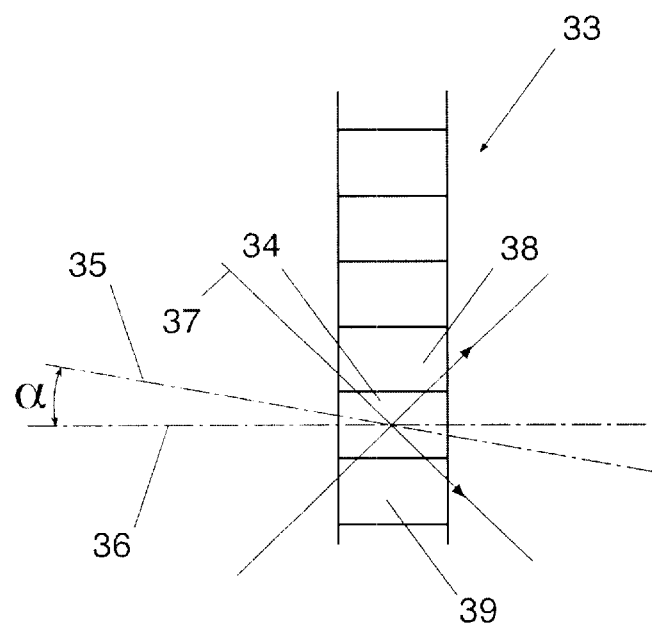
FIG. 3-B(PRIOR ART)

METHOD AND SYSTEM FOR ILLUMINATION USING LASER DIODE BAR AND MICROLENSES ARRAY OF SAME PITCH

FIELD OF THE INVENTION

The present invention relates generally to optical systems and more particularly relates to an optical system for illuminating a spatial light modulator (SLM).

BACKGROUND OF THE INVENTION

Optical printing head systems are known in the art and are currently being used in a variety of applications. One way of constructing optical printing head systems is by using one or more high power laser diode bars (LDB) or laser diode arrays (LDA).

Laser diode bars (LDB) are used as light sources in imaging systems, like thermal recording systems. The emitters of the laser diode bar are all operated simultaneously in a continuous operation mode, thus the LDB can not be modulated. In order to produce the light modulation needed for creating a desired image, the light beams emitting from the laser diode bar can be transmitted to a multichannel spatial light modulator (SLM), which modulates the light according to the image information.

In a regular operation mode, the light emitting from the emitters of the LDB reaches many of the pixels of the SLM. In this way redundancy is built in the system, in the sense that if one of the emitters of the LDB fails to work, the system will still operate properly.

A conventional art spatial light modulator system is described in U.S. Pat. No. 5,521,748 and shown in FIG. 1. Referring to FIG. 1, the system employs a laser diode bar 10 in conjunction with a microlenses lenslet 12, the microlenses of the lenslet 12 having the same spacing as the emitters of the LDB 10. The light from the emitters of the LDB 10 passes through the lenslet 12 and a field lens 14, which is used to focus the respective light beams on a modulator 16. The light beams, after passing through elements of the modulator area 16, are imaged by imaging optics 18 onto the film plane 20.

U.S. Pat. No. 5,517,359 provides a spatial light modulator system wherein the microlenses have a pitch which is less than but substantially equal to the pitch of the emitters of the LDB, as shown in FIG. 2. A laser diode 21 emits a light beam 22 which is collimated in the vertical dimension by a cylindrical lens 23. A second microlens 24 is a linear array of cylindrical lenslets aligned with the emitters of the laser diode. The light from the lenslets of microlens 24 is collimated by cylindrical lens 25 and imaged on a line of linear light valve 26. A polarizer prism 27 transmits the light of horizontal polarization and reflects the light 31 whose polarization was changed by passing through activated PLZT (lead-lanthanum zirconate titanate ceramic) cells, that are used as the linear light valve 26. An imaging lens 28 images light valve 26 onto heat sensitive (or light sensitive) material 29, forming an image 30.

Spatial Light Modulators may be of various types. Some SLMs operate in a reflective mode, using an array of micromirrors (for example, the Deformable Mirror Device from Texas Instruments incorporated of Texas US), or use deformable membranes reflective elements, like those of Optron Systems, Inc. Bedford, Mass. U.S.A. and Silicon Light Machines, Inc. Sunnyvale, Calif. U.S.A. Other SLMs are based on polarization rotation, like Liquid Crystal Display (LCD) devices.

Other known SLMs are based on electro-optics devices like PLZT. Electro-optical materials, like PLZT or KPT (potassium titanyl phosphate crystal), are used to modulate the light. The operation is based on the modification of the polarization state of the light when it passes through the crystal, while an electric field is applied to the crystal. These devices have the advantage of having a very fast response time, since small size devices have small capacitance and can easily switch polarization state for modulation in 1 ns or even faster. These modulators can be built in arrays (as in U.S. Pat. No. 5,521,748 mentioned above).

A major problem that exists in illumination systems employing an SLM is crosstalk between adjacent channels of light, which occurs if the SLM is not properly illuminated. This will take place, for example, if light entering a certain pixel of the SLM leaves the SLM through another pixel. Obviously, crosstalk results in a blurry and inaccurate image.

FIG. 3A is a schematic illustration of a light beam reaching a pixel 32 located at the middle of an SLM 33 in a conventional art system. The interaction length L of the pixel 32 is chosen such that a light beam enters the SLM through the pixel 32 and exits through the same pixel 32. In this way, no crosstalk occurs between the channels.

FIG. 3B is a schematic illustration of a light beam reaching a pixel 34 located close to the edge of an SLM 33, in a conventional art system. A light beam 37 having the same divergence as in FIG. 3A is shown, the light beam 37 having an axis 35 at an angle a with respect to the optical axis 36. It can be seen that the upper ray 37 depicting the light beam enters the pixel 34 through a neighboring pixel 38, and leaves the pixel 34 through the neighboring pixel 39. This is an example of crosstalk.

In both conventional art patents described above, no optimization of the divergence of the light beams reaching the pixels of the SLM is performed. In particular, the angles of the light beams reaching the pixels at the edges of the SLM are larger than the angles of the light beams reaching the pixels at the center of the SLM, thus increasing the possibility of crosstalk between adjacent channels of light.

A possible known way to solve the crosstalk problem is by narrowing the depth of the SLM, thus shortening the path of the light beam through the SLM and decreasing the possibility of crosstalk to occur.

The main disadvantage of this solution is that by shortening the path of the light beam through the SLM, the voltage which is needed in order to modulate the light by using the electro-optic effect increases. This is because the electro-optic effect is proportional to the product of the distance the light beam passes through the medium and the voltage used. Therefore, a decrease in the distance requires an increase in the voltage.

This disadvantage becomes a major barrier in illumination systems that require a substantial interaction length between the medium and the light to produce the modulation effect. For example, in an illumination system employing an PLZT SLM, an interaction length of about 200 $\mu$ is required between the crystal and the light in order to produce the modulation effect at voltages on the order of 50V to 80V. Shortening the path of the light in order to prevent crosstalk from occurring will substantially limit the modulation rate.

SUMMARY OF THE INVENTION

The object of the present invention is to provide a system and a method for illuminating a spatial light modulator, that reduces the crosstalk between adjacent channels, by reducing the divergence of the illumination of the SLM. The present invention is to be used preferably in conjunction with SLMs requiring long interaction length.

There is thus provided in accordance with a preferred embodiment of the present invention, a system including a linear array of light sources for generating a plurality of light beams, a linear array of microlenses, each of the microlenses receiving light from a corresponding light source of the array of light sources, an optical element for receiving light from the array of microlenses and for redirecting it and a spatial light modulator including an array of pixels for modulating the light. The distance between the array of microlenses and the optical element is such that all the pixels of the SLM are illuminated symmetrically with respect to the optical axis of the optical element.

Moreover, in accordance with a preferred embodiment of the present invention, the distance between the array of microlenses and the optical element is set according to the equation:

$$D \approx \frac{f_1 * H_{SLM}}{E}$$

wherein D represents the distance between the array of microlenses and the optical element, $f_1$ represents the focal length of each of the microlenses, $H_{SLM}$ represents the height of the spatial light modulator and E represents the size of each of the light sources.

Still further, in accordance with a preferred embodiment of the present invention, each of the microlenses is positioned such that its corresponding light source lies on its focal plane.

Additionally, in accordance with a preferred embodiment of the present invention, each of the microlenses is positioned on the plane where light beams from adjacent light sources of the array of light sources first intersect. Then, the distance between the array of microlenses and the optical element is set according to the equation:

$$D \approx \frac{\left(\frac{P}{E} - 1\right) * H_{SLM}}{2 * NA_{BAR}}$$

wherein D represents the distance between the array of microlenses and the optical element, P represents the pitch of the array of light sources, E represents the size of each of the light sources, $H_{SLM}$ represents the height of the spatial light modulator and $NA_{BAR}$ represents the numerical aperture emitted by each of the light sources.

There is also provided in accordance with another preferred embodiment of the present invention a method of directing light from an array of light sources to a spatial light modulator including the steps of:

transmitting light from each light source of the array of light sources through a corresponding microlens of an array of microlenses; and positioning each of the microlenses such that all the pixels of the spatial light modulator are illuminated symmetrically with respect to the optical axis of the optical element.

The method of the invention may further include the step of positioning the array of microlenses at a distance from the optical element set according to the equation:

$$D \approx \frac{f_1 * H_{SLM}}{E}$$

wherein D represents the distance between the array of microlenses and the optical element, $f_1$ represents the focal length of each of the microlenses, $H_{SLM}$ represents the height of the spatial light modulator and E represents the size of each of the light sources.

Additionally, the method of the present invention may further include the step of positioning each of the microlenses such that its corresponding light source lies on its focal plane.

Still further, in accordance with a preferred embodiment of the present invention, the method may include the step of positioning each of the microlenses on the plane where light beams from adjacent light sources of the array of light sources first intersect. Then, the method of the present invention may include the step of positioning the array of microlenses at a distance from the optical element set according to the equation:

$$D \approx \frac{\left(\frac{P}{E} - 1\right) * H_{SLM}}{2 * NA_{BAR}}$$

wherein D represents the distance between the array of microlenses and the optical element, P represents the pitch of the array of light sources, E represents the size of each of the light sources, $H_{SLM}$ represents the height of the spatial light modulator and $NA_{BAR}$ represents the numerical aperture emitted by each of the light sources.

The spatial light modulator may be an array of micromirrors, may include deformable membranes reflective elements, may be based on polarization rotation or may include electro-optic devices.

BRIEF DESCRIPTION OF THE DRAWINGS

The present invention is described with reference to the accompanying drawings, wherein like reference numerals or characters indicate corresponding or like components. In the drawings:

FIG. 3A is a schematic illustration of a light beam reaching the central pixel of an SLM, in a conventional art system;

FIG. 3B is a schematic illustration of a light beam reaching a pixel at the edge of an SLM, in a conventional art system;

DETAILED DESCRIPTION OF THE INVENTION

The present invention provides a system and a method for illuminating a spatial light modulator, where all the pixels of the SLM are illuminated symmetrically with respect to the optical axis, thus reducing the crosstalk problem. The system includes a linear array of light sources for generating a plurality of light beams, a linear array of microlenses, each of the microlenses receiving light from a corresponding light source of the array of light sources, an optical element for receiving light from the array of microlenses and for redirecting it and a spatial light modulator including an array of pixels for modulating the light. The distance between the array of microlenses and the optical element is such that all the pixels of the SLM are illuminated symmetrically with respect to the optical axis of the optical element.

The present invention will be described referring mainly to the optical configuration in the plane of the junction of the laser diode bar.

Figure 1:
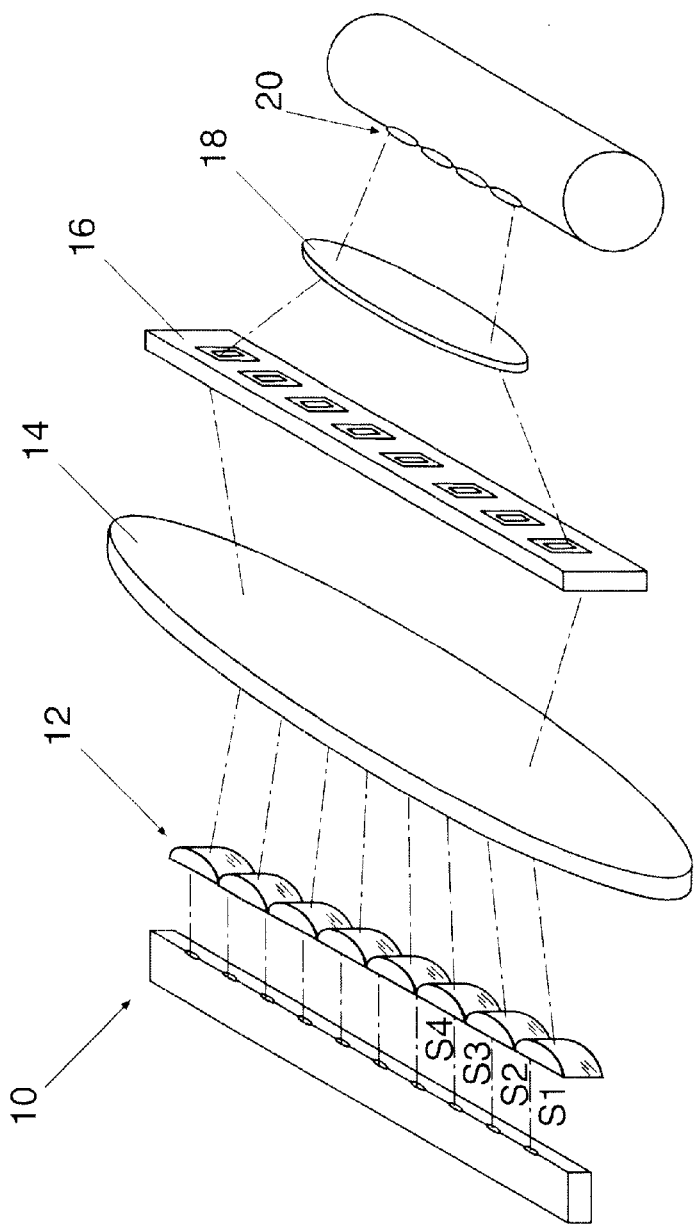
FIG. 1 is a schematic illustration of a conventional art illumination system using a laser diode bar and microlenses with a pitch equal to the pitch of the emitters.
Figure 2:
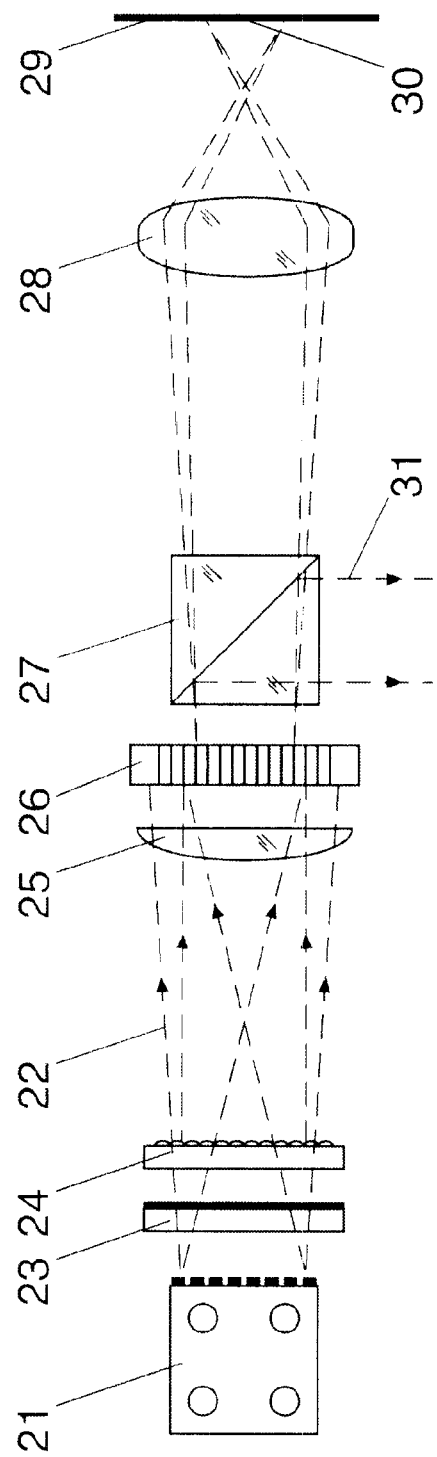
FIG. 2 is a schematic illustration of a conventional art illumination system using a laser diode bar, and microlenses with a pitch smaller than the pitch of the emitters.
Figure 4:
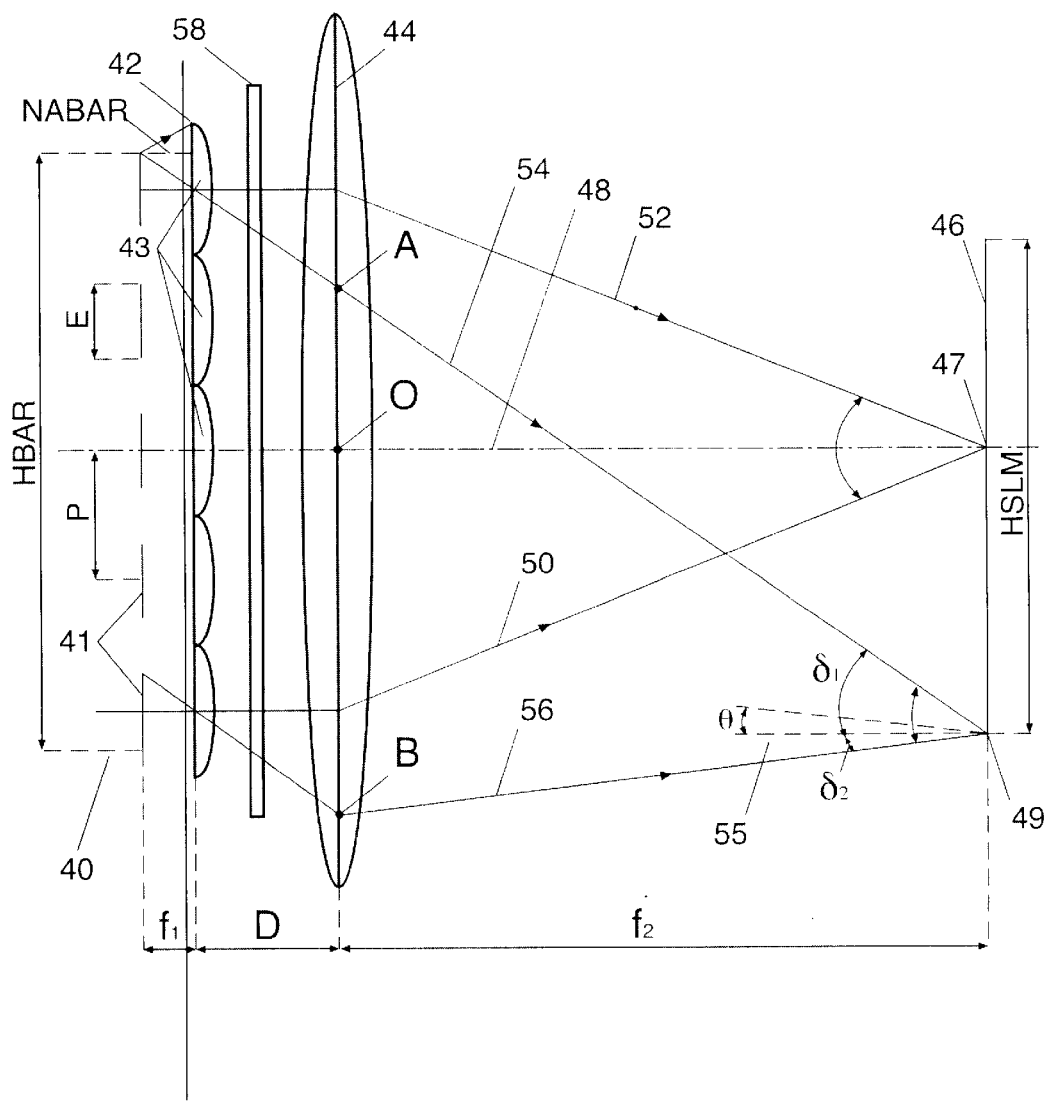
FIG. 4 is a schematic illustration of a ray path from the LDB to the SLM in a conventional art system, similar to the system of FIG. 1.

Reference is now made to FIG. 4, which is a schematic illustration of a ray path from an LDB 40 to an SLM 46 in a conventional art system. The emitters 41 of the LDB 40 are imaged on the SLM 46 by a microlenses array 42 and the focusing lens 44. Each microlens 43 is positioned in front of one emitter 41 of LDB 40, and collects light only from that emitter 41. Each microlens 43 is positioned such that its focal point falls on its corresponding emitter 41, thus the best light collimation is achieved. Furthermore, the spacing between microlenses 43 is equal to the pitch of LDB 40, thus the beams leaving the various microlenses 43 are parallel to each other.

The focusing lens 44 is positioned after the microlenses array 42. It is common to all the light beams emitted by the various emitters 41, and has a focal length $f_2$ such that the combination of the microlenses array 42 and the focusing lens 44 will image each emitter 41 on the entire SLM 46.

A generally cylindrical lens 58 is positioned between the array 42 of microlenses 43 and focusing lens 44. This lens provides collimation of the light in the planes perpendicular to the junction of the LDB 40, as will be explained below with reference to FIG. 7. The effect of lens 58 is negligible on the ray path in the plane of the junction of the LDB 40.

The result of this configuration is that the central point of each emitter 41 is imaged on the center 47 of the SLM 46 (for example rays 50 and 52, which are the rays emerging from the centers of the lowermost and uppermost emitters, respectively). Similarly, the upper edge points of each emitter 41 are imaged on a common point 49 at the edge of SLM 46 (for example rays 54 and 56, which are the rays emerging from the uppermost edges of the uppermost and lowermost emitters, respectively).

In a conventional art system, the light beams converging towards the edges of the SLM are not symmetrical with respect to the optical axis 48 and only the light beams converging towards the center of SLM 46 are symmetrical with respect to the optical axis 48.

It is assumed that the angles are small enough so that their values (in radians) are equal to their sine and tangent values. This assumption is based on the fact that the size E of an emitter 41 is of the order of tens of microns, the focal length $f_1$ of the microlenses 43 is of the order of hundreds of microns, the distance D between the microlenses array 42 and the focusing lens 44 is of the order of hundreds of millimeters and the focal length $f_2$ of the focussing lens 44 is also of the order of hundreds of millimeters. Additionally, it is assumed that the emitters 41 are small compared to the width of the LDB 40.

The numerical aperture NA of a light beam when reaching the center of the SLM 46 can be described by the following equation:

$$NA \approx \frac{H_{Bar}}{2f_2} \qquad (1)$$

where $H_{Bar}$ is the width of the LDB 40.

As mentioned above, in a conventional art system, the light beams converging towards the edges of the SLM are not symmetrical with respect to the optical axis 48. In general, the angles $\delta_1$ and $\delta_2$ shown in FIG. 4, which are the angles between rays 54 and 56 and the optical axis 48, respectively, are not equal, although their mean value is equal to the NA, as will be explained below.

Reference is now made to ray 54 depicting the upper edge of light beam 55. Ray 54 emerges from the upper edge of the uppermost emitter. The focal lengths $f_1$ and $f_2$ are such that each emitter 41 is magnified to the size of the SLM 46. Therefore, ray 54 reaches the lower edge of the SLM 46.

Based on simple geometrical considerations the following equation can be written:

$$OA = \frac{H_{BAR}}{2} - \frac{E*D}{2f_1} \qquad (2)$$

where OA is the distance between the point where ray 54 hits the focusing lens 44 and the optical axis 48.

Based again on simple geometric considerations and on Equation (2) the following equation is obtained:

$$\delta_1 \approx \frac{OA + \frac{H_{SLM}}{2}}{f_2} \approx \frac{H_{BAR}}{2f_2} - \frac{E*D}{2f_1 f_2} + \frac{H_{SLM}}{2f_2} \qquad (3)$$

where $\delta_1$ is the angle between ray 54 and the optical axis 48 and $H_{SLM}$ is the height of the SLM 46.

Reference is now made to ray 56 depicting the lower edge of light beam 55. Ray 56 emerges from the upper edge of the lowermost emitter. By similar geometrical considerations the following equation can be written:

$$OB = \frac{H_{BAR}}{2} + \frac{E*D}{2f_1} \qquad (4)$$

where OB is the distance between the point where ray 56 hits the focusing lens 44 and the optical axis 48.

Another equation that is obtained is:

$$\delta_2 \approx \frac{OB - \frac{H_{SLM}}{2}}{f_2} \approx \frac{G_{BAR}}{2f_2} + \frac{E*D}{2f_1 f_2} - \frac{H_{SLM}}{2f_2} \qquad (5)$$

where $\delta_2$ is the angle between ray 56 and the optical axis 48.

Since the numerical aperture NA is equal to half the beam angle, the following equation is obtained:

$$NA \approx \frac{\delta_1 + \delta_2}{2} \approx \frac{H_{BAR}}{2f_2} \qquad (6)$$

Comparing Equations (1) and (6) indicates that the numerical aperture (NA) of the illumination is equal at all positions across the SLM 46.

As mentioned above, the light beams not reaching the center of the SLM 46, for example light beam 55 depicted by rays 54 and 56, impinge the SLM 46 with an axis which is not parallel to the optical axis 48, but rather at an angle θ with respect to the optical axis 48, where:

$$\theta = \frac{|\delta_1 - \delta_2|}{2} \qquad (7)$$

This is actually the reason that crosstalk occurs, as explained above with reference to FIG. 3B.

Figure 5:
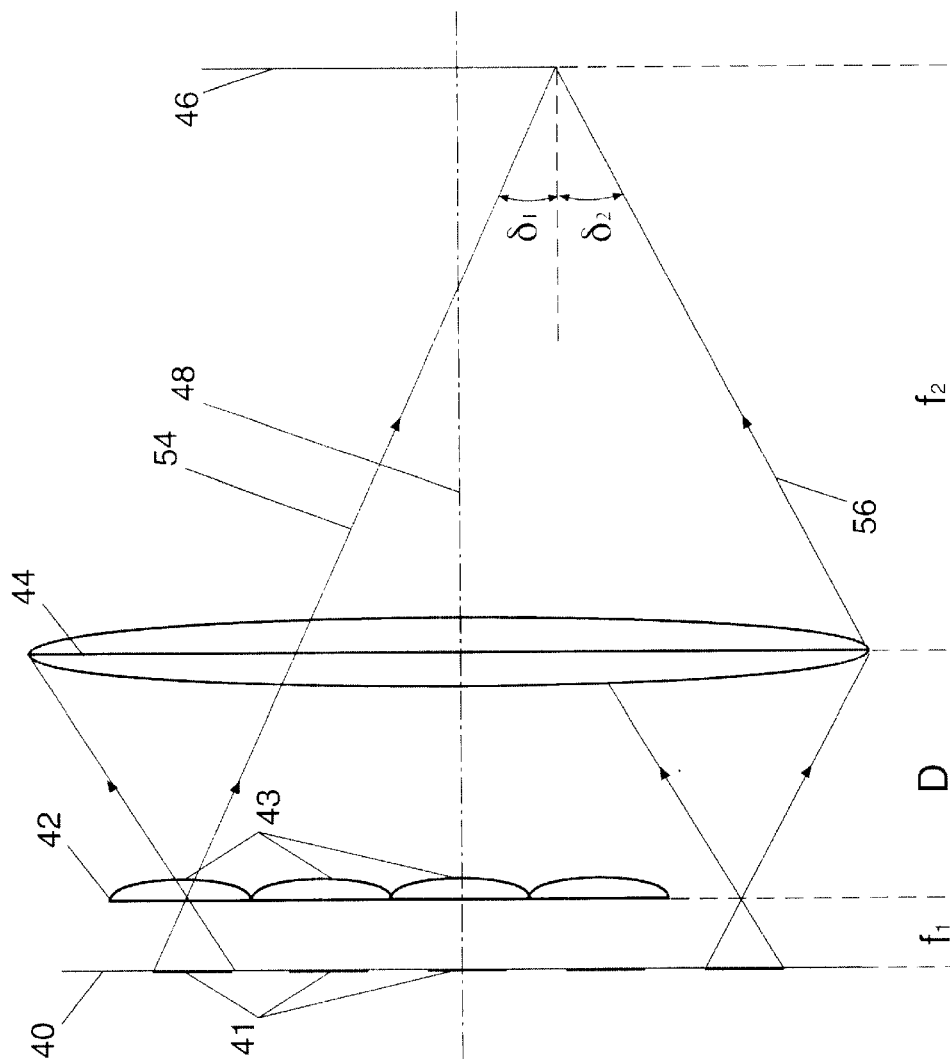
FIG. 5 is a schematic illustration of a ray path from the LDB to the SLM, according to a preferred embodiment of the present invention.
Figure 6:
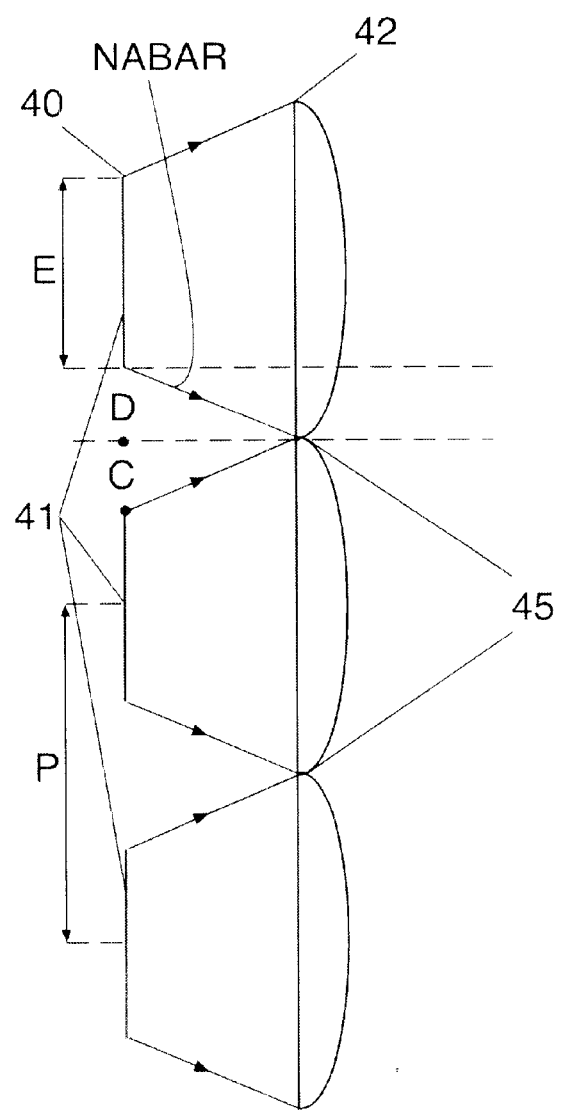
FIG. 6 is a schematic illustration of a ray path from the LDB to the microlenses array, according to a preferred embodiment of the present invention.

Reference is now made to FIGS. 5 and 6, which are schematic illustrations of an illumination system according to a preferred embodiment of the present invention. Elements of FIGS. 5 and 6 which are similar to those of FIG. 4 have the same reference numerals.

In the system of the preferred embodiment, the same microlenses array as in FIG. 4 is employed, and placed at a distance from the LDB 40 such that the emitters 41 lie on the focal plane of the microlenses 43.

The distinction between the system of the present invention and conventional art systems is that in the system of the present invention the distance D between the microlenses array 42 and the focusing lens 44 is determined such that the angles $\delta_1$ and $\delta_2$ are equal, and consequently $\theta$ is equal to zero ($\theta=0$).

The value of D that fulfils the condition of symmetric imaging all across the LDB 40 (meaning that angles $\delta_1$ and $\delta_2$ are equal) is obtained by inserting Equation (3) and Equation (5) into the above equivalence ($\delta_1=\delta_2$):

$$D \approx \frac{f_1 * H_{SLM}}{E} \quad (8)$$

In the preferred embodiment of the present invention, the microlenses 43 are positioned in the plane where light beams emitted from two neighboring emitters 41 first intersect (two such intersections are shown in FIG. 6 by reference numeral 45). Under this condition, the following equation is obtained:

$$NA_{BAR} \approx \frac{CD}{f_1} \quad (9)$$

where CD is the distance between point C which is at an edge of an emitter 41 and point D which is a middle point between the emitter 41 and a neighboring emitter and $NA_{BAR}$ is the numerical aperture emitted by each of the emitters 41. The distance CD represents half the distance between two neighboring emitters all across the LDB 40.

The following equation is then obtained:

$$f_1 \approx \frac{P-E}{2*NA_{BAR}} \quad (10)$$

where P is the pitch of the LDB 40.

By inserting Equation (10) into Equation (8), the following equation can be obtained:

$$D \approx \frac{\left(\frac{P}{E}-1\right)*H_{SLM}}{2*NA_{BAR}} \quad (11)$$

By adjusting the distance D between the microlenses array and the focusing lens to the values indicated above in Equation (8) or in Equation (11), the pixels of the SLM 46 are illuminated symmetrically all over the SLM 46, and the interaction length between the SLM 46 and the light beams can be as long as allowed by the divergence of the illumination beams at all the pixels, and the system will operate at the lowest possible voltage.

Figure 7:
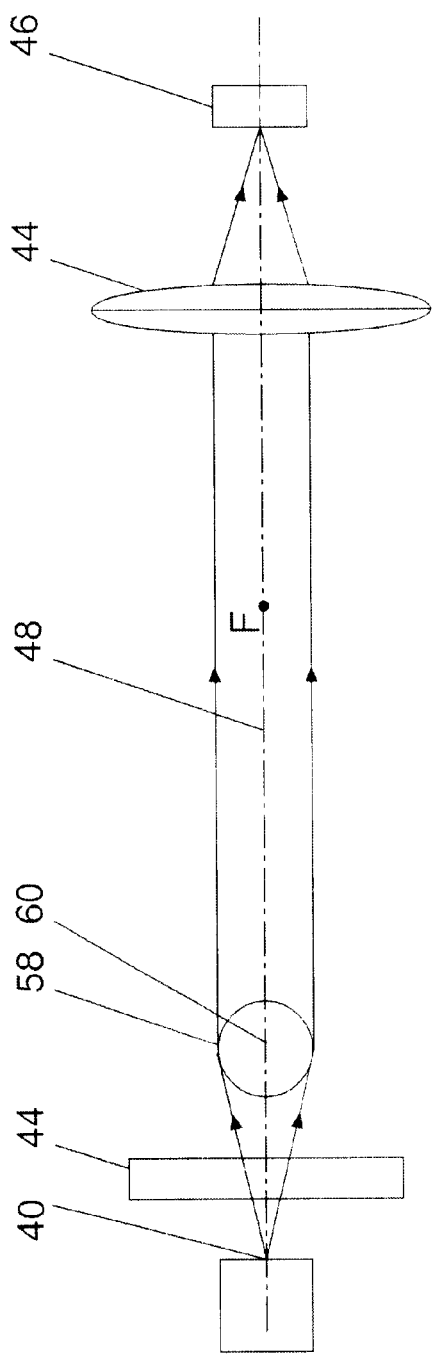
FIG. 7 is a schematic illustration of the optical configuration in a plane perpendicular to the junction of the LDB according to a preferred embodiment of the present invention.

The optical configuration in the plane perpendicular to the junction of the LDB 40 and that includes the optical axis 48 is similar to that of conventional art illumination systems, and is briefly described in FIG. 7. Elements in FIG. 7 which are similar to those of FIG. 5 have the same reference numerals.

A generally cylindrical lens 58 is positioned such that its axis 60 is parallel to the line of emitters 41 of the LDB 40. The lens 58 provides collimation of the light in the planes perpendicular to the junction of the emitters and to the optical axis 48. Consequently, lens 58 and focusing lens 44 image the emitters 41 on the pixels of the SLM 46. The magnification achieved by this imaging is set by selecting the focal lengths of lenses 44 and 58, in accordance with the size of the pixels of the SLM 46.

Lens 58 can be of various types, for example cylindrical with homogeneous refractive index, cylindrical with refractive index grading, generally cylindrical with aspheric surfaces, and more.

Although the invention has been described in conjunction with a specific embodiment thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A system for illuminating a spatial light modulator comprising:
    a linear array of light sources for generating a plurality of light beams;
    a linear array of microlenses, each of said microlenses receiving light from a corresponding light source of said array of light sources;
    an optical element for receiving light from said microlenses array and for redirecting it; and
    a spatial light modulator comprising an array of pixels for modulating said light;
    wherein the distance between said array of microlenses and said optical element is such that all the pixels of said spatial light modulator are illuminated symmetrically with respect to the optical axis of said optical element.

2. The system according to claim 1 wherein said distance between said array of microlenses and said optical element is set according to the equation:

$$D \approx \frac{f_1 * H_{SLM}}{E}$$

wherein D represents said distance, $f_1$ represents the focal length of each of said microlenses, $H_{SLM}$ represents the height of said spatial light modulator and E represents the size of each of said light sources.

3. The system according to claim 1 wherein each of said microlenses is positioned such that said corresponding light source lies on its focal plane.

4. The system according to claim 1 wherein each of said microlenses is positioned on the plane where light beams from adjacent light sources of said array of light sources first intersect.

5. The system according to claim 4 wherein said distance between said array of microlenses and said optical element is set according to the equation:

$$D \approx \frac{\left(\frac{P}{E}-1\right)*H_{SLM}}{2*NA_{BAR}}$$

wherein D represents said distance, P represents the pitch of said array of light sources, E represents the size of each of said light sources, $H_{SLM}$ represents the height of said spatial light modulator and $NA_{BAR}$ represents the numerical aperture emitted by each of said light sources.

6. The system according to claim 1 wherein said spatial light modulator is an array of micromirrors.

7. The system according to claim 1 wherein said spatial light modulator is deformable membranes reflective elements.

8. The system according to claim 1 wherein said spatial light modulator is based on polarization rotation.

9. The system according to claim 1 wherein said spatial light modulator is electro-optic devices.

10. In a light imaging system comprising an array of light sources, an array of microlenses, an optical element and a spatial light modulator, a method of directing light from said array of light sources to said spatial light modulator comprising the steps of:

transmitting light from each light source of said array of light sources through a corresponding microlens of said array of microlenses; and positioning said array of microlenses such that all the pixels of said spatial light modulator are illuminated symmetrically with respect to the optical axis of said optical element.

11. The method according to claim 10 further comprising the step of positioning said array of microlenses at a distance from said optical element set according to the equation:

$$D \approx \frac{f_1 * H_{SLM}}{E}$$

wherein D represents said distance, $f_1$ represents the focal length of each of said microlenses, $H_{SLM}$ represents the height of said spatial light modulator and E represents the size of each of said light sources.

12. The method according to claim 10 further comprising the step of positioning each of said microlenses such that said corresponding light source lies on its focal plane.

13. The method according to claim 10 further comprising the step of positioning each of said microlenses on the plane where light beams from adjacent light sources of said array of light sources first intersect.

14. The method according to claim 13 further comprising the step of positioning said array of microlenses at a distance from said optical element set according to the equation:

$$D \approx \frac{\left(\frac{P}{E} - 1\right) * H_{SLM}}{2 * NA_{BAR}}$$

wherein D represents said distance, P represents the pitch of said array of light sources, E represents the size of each of said light sources, $H_{SLM}$ represents the height of said spatial light modulator and $NA_{BAR}$ represents the numerical aperture emitted by each of said light sources.

15. The method according to claim 10 wherein said spatial light modulator is an array of micromirrors.

16. The method according to claim 10 wherein said spatial light modulator is deformable membranes reflective elements.

17. The method according to claim 10 wherein said spatial light modulator is based on polarization rotation.

18. The system according to claim 10 wherein said spatial light modulator is electro-optic devices.

19. A system for illuminating a spatal light modulator comprising:

a linear array of light sources for generating a plurality of light beams;

a linear array of microlenses, each of said microlenses receiving light from a corresponding light source of said array of light sources;

an optical element for receiving light from said microlenses array and for redirecting it; and a spatial light modulator comprising an array of pixels for modulating said light;

wherein the distance between said array of microlenses and said optical element is such that all the pixels of said spatial light modulator are illuminated syretrically with respect to the optical axis of said optical element and is set according to the equation:

$$D \approx \frac{f_1 * H_{SLM}}{E}$$

wherein D represents said distance, $f_1$ represents the focal length of each of said microlenses, $H_{SLM}$ represents the height of said spatial light modulator and E represents the size of each of said light sources.

20. A system for illuminating a spatial light modulator comprising:

a linear array of light sources for generating a plurality of light beams;

a linear array of microlenses, each of said microlenses receiving light from a corresponding light source of said array of light sources;

an optical element for receiving light from said microlenses array and for redirecting it; and a spatial light modulator comprising an array of pixels for modulating said light;

wherein the distance between said array of microlenses and said optical element is such that all the pixels of said spatial light modulator are illuminated symmetrically with respect to the optical axis of said optical element; and wherein each of said microlenses is positioned on the plane where light beams from adjacent light sources of said array of light sources first intersect.

21. The system according to claim 20 wherein said distance between said array of microlenses and said optical element is set according to the equation:

$$D \approx \frac{\left(\frac{P}{E} - 1\right) * H_{SLM}}{2 * NA_{BAR}}$$

wherein D represents said distance, P represents the pitch of said array of light sources, E represents the size of each of said light sources, $H_{SLM}$ represents the height of said spatial light modulator and $NA_{BAR}$ represents the numerical aperture emitted by each of said light sources.

22. In a light imaging system comprising an array of light sources, an array of microlenses, an optical element and a spatial light modulator, a method of directing light from said array of light sources to said spatial light modulator comprising the steps of:

transmitting light from each light source of said array of light sources through a corresponding microlens of said array of microlenses; and positioning said array of microlenses such that all the pixels of said spatial light modulator are illuminated symmetrically with respect to the optical axis of said optical element and is set according to the equation:

$$D \approx \frac{f_1 * H_{SLM}}{E}$$

wherein D represents said distance, $f_1$ represents the focal length of each of said microlenses, $H_{SLM}$ represents the height of said spatial light modulator and E represents the size of each of said light sources.

23. In a light aging system comprising an array of light sources, an array of microlenses, an optical element and a spatial light modulator, a method of directing light from said array of light sources to said spatial light modulator comprising the steps of:
   transmitting light from each light source of said array of light sources through a corresponding microlens of said array of microlenses; and
   positioning said array of microlenses such that all the pixels of said spatial light modulator are illuminated symmetrically with respect to the optical axis of said optical element; and
   positioning each of said microlenses on the plane where light beams from adjacent light sources of said array of light sources first intersect.

24. The method according to claim 23 further comprising the step of positioning said array of microlenses at a distance from said optical element set according to the equation:

$$D \approx \frac{\left(\frac{P}{E} - 1\right) * H_{SLM}}{2 * NA_{BAR}}$$

wherein D represents said distance, P represents the pitch of said array of light sources, E represents the size of each of said light sources, $H_{SLM}$ represents the height of said spatial light modulator and $NA_{BAR}$ represents the numerical aperture emitted by each of said light sources.

* * * * *

UNITED STATES PATENT AND TRADEMARK OFFICE
CERTIFICATE OF CORRECTION

PATENT NO. : 6,407,849 B1
DATED : June 18, 2002
INVENTOR(S) : Steinblatt, Serge

It is certified that error appears in the above-identified patent and that said Letters Patent is hereby corrected as shown below:

<u>Column 9,</u>
Line 62, please delete "The system" and insert in lieu of -- The method --.
Line 64, please delete "spatal" and insert in lieu of -- spatial --.

<u>Column 10,</u>
Line 11, please delete "syretically" and insert in lieu of -- symmetrically --.

<u>Column 11,</u>
Line 11, please delete "aging" and insert in lieu of -- imaging --.

Signed and Sealed this

Third Day of June, 2003

JAMES E. ROGAN
*Director of the United States Patent and Trademark Office*